(12) United States Patent
Harper et al.

(10) Patent No.: US 8,794,372 B2
(45) Date of Patent: Aug. 5, 2014

(54) MARINE MECHANICAL SEISMIC SOURCE (75) Inventors: Mark Harper, Cambridge (GB);
Martin Thompson, Cambridge (GB);
Stuart C. Moore, Cambridge (GB)

(73) Assignee: BP Coporation North America Inc.,
Houston, TX (US)

( * ) Notice: Subject to any disclaimer, the term of this patent is extended or adjusted under 35 U.S.C. 154(b) by 504 days.

(21) Appl. No.: 13/156,191

(22) Filed: Jun. 8, 2011

(65) Prior Publication Data
US 2011/0297476 A1 Dec. 8, 2011

Related U.S. Application Data (60) Provisional application No. 61/352,599, filed on Jun. 8, 2010.

(51) Int. Cl.
*G01V 1/02* (2006.01)
(52) U.S. Cl.
USPC ............ 181/113; 181/121; 181/142; 181/161
(58) Field of Classification Search
USPC .................................. 181/113, 121, 142, 161
See application file for complete search history.

(56) References Cited

U.S. PATENT DOCUMENTS

| 2,675,086 | A | | 4/1954 | Clewell | |
|---|---|---|---|---|---|
| RE26,748 | E | * | 12/1969 | Schempf | 181/120 |
| 4,061,443 | A | * | 12/1977 | Black et al. | 417/222.1 |
| 4,207,154 | A | * | 6/1980 | Lemelson | 204/157.41 |
| 5,717,170 | A | | 2/1998 | Anstey | |
| 6,230,840 | B1 | * | 5/2001 | Ambs | 181/113 |
| 7,216,738 | B2 | * | 5/2007 | Birchak et al. | 181/121 |
| 8,132,641 | B2 | * | 3/2012 | Hampshire et al. | 181/113 |
| 8,387,744 | B2 | * | 3/2013 | Harper et al. | 181/120 |
| 2008/0232636 | A1 | * | 9/2008 | Thurber et al. | 381/405 |
| 2009/0320640 | A1 | * | 12/2009 | Elliott et al. | 74/572.21 |
| 2011/0226220 | A1 | * | 9/2011 | Wilkins | 123/48 B |

FOREIGN PATENT DOCUMENTS

| EP | 0 865 023 A1 | 9/1998 |
|---|---|---|
| FR | 715 055 A | 11/1931 |

OTHER PUBLICATIONS

PCT International Search Report and the Written Opinion of the International Searching Authority, or the Declaration, mailed on Mar. 28, 2012, for International application No. PCT/US2011/039619, 11 pages.
Penkin S. I., "Low-Frequency Underwater Acoustic Radiator With a Tunable-Resonance Mechanoacoustic Vibrating System", vol. 37, No. 6, Nov. 1, 1991, pp. 619-622, Soviet Physics Acoustics, American Institute of Physics, New York, NY, US.

* cited by examiner

*Primary Examiner* — Forrest M Phillips
(74) *Attorney, Agent, or Firm* — Gunnar Heinisch (57) ABSTRACT

A marine seismic source comprises a housing having a central axis, an open end, and a closed end opposite the open end. In addition, the source comprises a piston coaxially disposed within the housing. In addition, the source comprises a flywheel disposed within the housing and axially positioned between the closed end and the piston. The flywheel is configured to rotate about a rotational axis. Further, the source comprises a connecting rod moveably coupling the piston to the flywheel. The connecting rod has a first end pivotally coupled to the piston and a second end pivotally coupled to the flywheel. The second end of the connecting rod has a first position at a first distance measured radially from the rotational axis, and a second position at a second distance measured radially from the rotational axis. The first distance is less than the second distance.

24 Claims, 6 Drawing Sheets

MARINE MECHANICAL SEISMIC SOURCE

CROSS-REFERENCE TO RELATED APPLICATIONS

This application claims benefit of U.S. provisional patent application Ser. No. 61/352,599 filed Jun. 8, 2010, and entitled "Marine Mechanical Seismic Source," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to seismic prospecting. More particularly, the invention relates to seismic sources for generating acoustic signals in water for marine seismic surveys.

2. Background of the Technology

Scientists and engineers often employ seismic surveys for exploration, archeological studies, and engineering projects. In general, a seismic survey is an attempt to map the subsurface of the earth to identify formation boundaries, rock types, and the presence or absence of fluid reservoirs. Such information greatly aids searches for water, geothermal reservoirs, and mineral deposits such as hydrocarbons. Petroleum companies frequently use seismic surveys to prospect for subsea hydrocarbon reserves.

During a subsea or marine seismic survey, an acoustic energy source, also referred to as a "seismic energy source" or simply "seismic source," is introduced into the water above the geologic structure of interest. In general, seismic sources can provide single, discrete pulses of seismic energy or continuous sweeps of seismic energy. Both types of seismic sources generate seismic energy signals or waves (i.e., pulse of acoustic energy) that propagate through a medium such as water or layers of rocks. In marine applications, each time the seismic source is triggered, it generates a seismic energy signal that propagates down through the water and the water-sea floor boundary into the subsea geological formations. Faults and boundaries between different formations create differences in acoustic impedance that cause partial reflections of the seismic waves. These reflections cause acoustic energy waves to return toward the water, where they may be detected at the seafloor by an array or set of ocean-bottom geophones or other seismic energy receivers, or detected within the water layer by an array or set of spaced hydrophones or other seismic energy receivers. The receivers generate electrical signals representative of the acoustic or elastic energy arriving at their locations.

The acoustic or elastic energy detected by the seismic receivers is generally amplified and then recorded or stored in either analog or digital form. The recording is made as a function of time after the triggering of the seismic energy source. The recorded data may be transported to a computer and displayed in the form of traces (i.e., plots of the amplitude of the reflected seismic energy as a function of time for each of the geophones or seismic energy receivers). Such displays or data subsequently undergo additional processing to simplify the interpretation of the arriving seismic energy at each receiver in terms of the subsurface layering of the earth's structure. Sophisticated processing techniques are typically applied to the recorded signals to extract an image of the subsurface structure.

There are many different methods for producing acoustic energy waves or pulses for seismic surveys. Conventional seismic surveys typically employ artificial seismic energy sources such as explosives (e.g., solid explosives or explosive gas mixtures), shot charges, air guns, or vibratory sources to generate seismic waves. Some of these approaches provide for strong acoustic waves, but may be harmful to marine life and/or incapable of limiting the generated acoustic waves to desired frequencies. A more controllable technique for producing acoustic waves is to employ a subsea or marine reciprocating piston seismic source. Such devices typically rely on a piston that acts against the water to generate extended-time acoustic energy frequency sweeps. The piston is usually driven by a linear actuator, a voice coil, or a piezoelectric crystal transducer. The piston may be directly driven, with the motion of the piston almost entirely constrained, or may resonate by balancing water forces against a tunable spring, with the driving force only "topping up" the energy lost to the water. The piston may also be partially constrained and partially allowed to undergo a controlled resonance. The tunable spring may be, for example, a mechanical spring, a regenerative electromagnetic inductive device, an air spring, or a combination of these.

Figure 1:
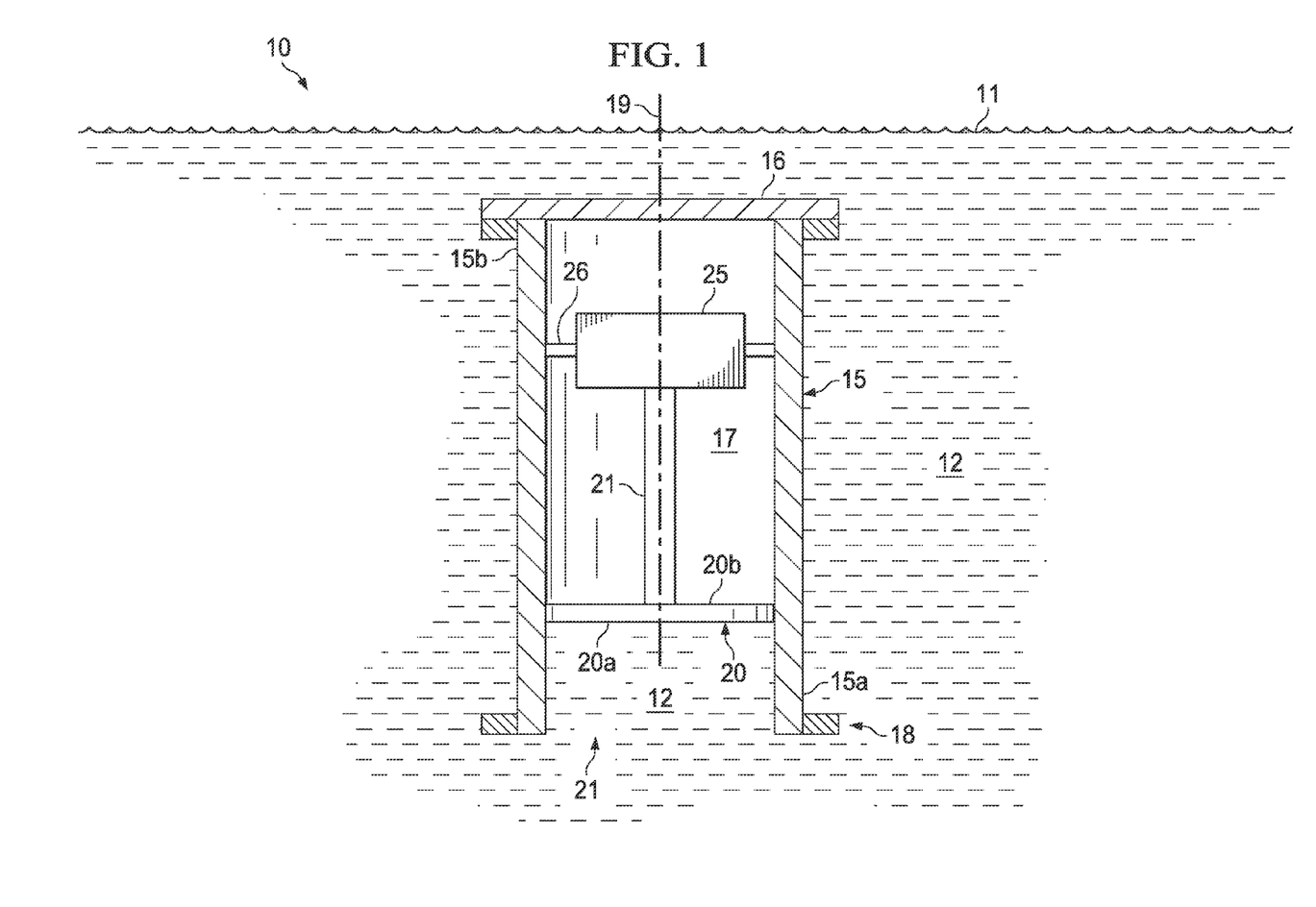
FIG. 1 is a schematic cross-sectional view of a conventional reciprocating piston marine seismic source.

FIG. 1 illustrates an example of a conventional reciprocating piston marine seismic source 10 disposed in water 12 beneath the sea surface 11. Source 10 includes a cylinder 15 having a central axis 19 and a piston 20 coaxially disposed in the cylinder 15. The lower end 15a of cylinder 15 is open to the water 12, and the upper end 15b of the cylinder 15 is sealed or closed off from the water 12 with a cap 16. Piston 20 sealingly engages cylinder 15, thereby defining a volume 17 within cylinder 15 that is filled with a compressible gas such as nitrogen or air. The piston 20 has a flat or planar face 20a that faces and operates against water 12 in the lower end 15a of cylinder 15 and a flat or planar face 20b that faces the air in volume 17. Piston 20 is coupled to a linear actuator 25 disposed in volume 17 with a shaft 21. The linear actuator 25 is held in position relative to the cylinder 15 by support members 26. Piston 20 axially oscillates within cylinder 15 under the control of the linear actuator 25. As piston 20 reciprocates within cylinder 15, face 20a acts against water 12 in lower end 15a to generate acoustic energy waves that propagate downward through the water 12.

Without being limited by this or any particular theory, axially reciprocating piston 20 solely with actuator 25 requires impractically large amounts of power. Therefore, in many cases, a tuned system (e.g., tunable spring) that resonates the piston at the desired output frequency is often employed, thereby reducing the total input power requirements. However, this solution has two disadvantages. First, the energy must be input during the active sweep (i.e., the phase in which the acoustic energy waves of a desired frequency or desired frequency range are being generated by the seismic source), which may be of a relatively brief duration compared to the time period between active sweeps. In general, the shorter the time period over which a given amount of energy is input, the greater the power requirements. Second, the energy must be added in a carefully controlled fashion such that it does not disrupt the resonance, and this must be done even as the resonant frequency changes as the device performs a sweep.

At higher frequencies and shallow water depths, an oscillating-piston seismic source may produce cavitation—a phenomenon that occurs when the local static pressure head minus the local vapor pressure head becomes less than the local piston-velocity head for some point on the piston face. When cavitation occurs, the seawater temporarily decouples from the moving piston face, leaving a vacuum adjacent to that part of the piston face. The vacuum then collapses violently, possibly damaging the piston face in the process. In addition, the abrupt collapse produces undesirable turbulence, which dissipates energy uselessly as heat instead of as acoustic radiation.

Accordingly, there remains a need in the art for marine seismic sources that produce energy in a controlled frequency sweep that is extended in time, without any impulsive shocks, and to produce energy only in the frequency bands of interest so that only the minimum necessary peak power is emitted at each frequency and all the energy emitted is useful. Such sources would be particularly well received if they can produce energy at frequencies lower than about 8 Hz, which has proven to be difficult to achieve to date using conventional seismic sources.

BRIEF SUMMARY OF THE DISCLOSURE

These and other needs in the art are addressed in one embodiment by a marine seismic source. In an embodiment, the source comprises a housing having a central axis, an open end, and a closed end opposite the open end. In addition, the source comprises a piston coaxially disposed within the housing. In addition, the source comprises a flywheel disposed within the housing and axially positioned between the closed end and the piston. The flywheel is configured to rotate about a rotational axis. Further, the source comprises a connecting rod moveably coupling the piston to the flywheel. The connecting rod has a first end pivotally coupled to the piston and a second end pivotally coupled to the flywheel. The second end of the connecting rod has a first position at a first distance measured radially from the rotational axis, and a second position at a second distance measured radially from the rotational axis. The first distance is less than the second distance.

These and other needs in the art are addressed in another embodiment by a method for generating a marine seismic energy wave in a body of water. In an embodiment, the method comprises (a) providing a seismic source. The seismic source includes a housing having a closed end and an open end, and a piston slidingly disposed within the housing. In addition, the seismic source includes a flywheel disposed in the housing between the closed end and the piston. The flywheel is configured to rotate about a rotational axis. The seismic source also includes a connecting rod having a first end pivotally coupled to the piston and a second end pivotally coupled to the flywheel. Further, the method comprises (b) positioning the seismic source in the water. Still further, the method comprises (c) rotating the flywheel about the rotational axis. Moreover, the method comprises (d) changing a first distance measured radially from the rotational axis to the second end of the connecting rod during (c).

These and other needs in the art are addressed in another embodiment by a method for generating a marine seismic energy wave in a body of water. In an embodiment, the method comprises (a) positioning a marine seismic source in the water. The seismic source includes a housing having a closed end and an open end, and a piston slidingly disposed within the housing. In addition, the seismic source includes a flywheel disposed in the housing between the closed end and the piston. The flywheel is configured to rotate about a rotational axis. The seismic source also includes a connecting rod having a first end pivotally coupled to the piston and a second end pivotally coupled to the flywheel. Further, the method comprises (b) positioning the second end of the connecting rod at or proximal the rotational axis of the flywheel. Still further, the method comprises (c) applying rotational torque to the flywheel after (b). Moreover, the method comprises (d) increasing the rotational speed of the flywheel during (c). The method also comprises (e) radially moving the second end of the connecting rod relative to the rotational axis.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. In addition, as used herein, the terms "axial" and "axially" generally mean along or parallel to a central axis (e.g., central axis of a structure), while the terms "radial" and "radially" generally mean perpendicular to the central axis. For instance, an axial distance refers to a distance measured along or parallel to the central axis, and a radial distance means a distance measured perpendicular to the central axis.

Figure 2:
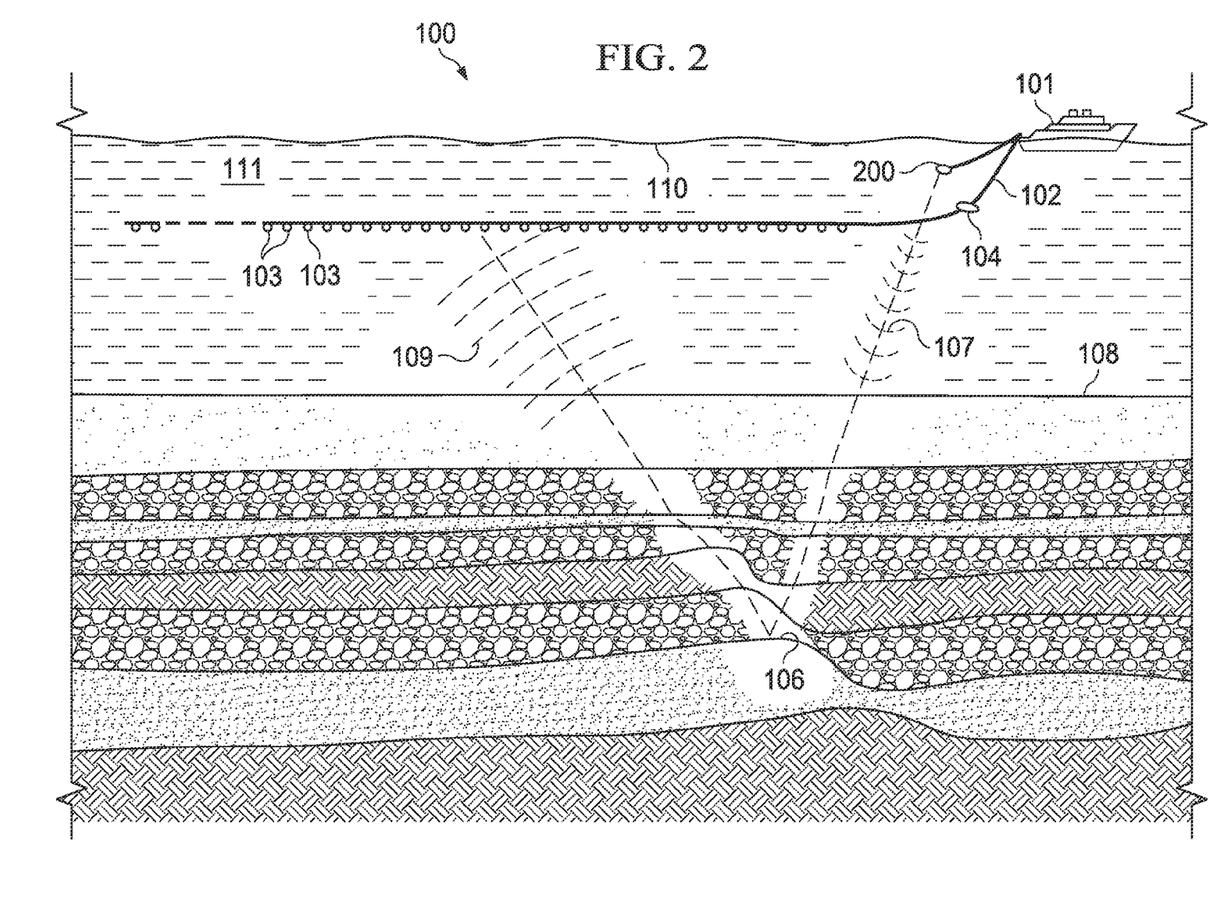
FIG. 2 is a schematic illustration of an embodiment of a marine seismic acquisition system.

Referring now to FIG. 2, an embodiment of a marine seismic acquisition system 100 is schematically shown. System 100 is employed to perform marine seismic exploration operations to survey the geological formations below the surface 110 of a body of water 111. In this embodiment, system 100 includes at least one seismic survey vessel 101 that tows at least one streamer 102 including a plurality of evenly-spaced seismic sensors or receivers 103. In this embodiment, each streamer 102 includes a steerable diverter 104 that controls the positioned and movement of streamer 102 relative to vessel 101. In particular, diverter 104 positions streamer 102 at a desired offset distance from vessel 101 and desired operating depth below the surface 110.

Streamers 102 may be up to several kilometers long, and are constructed in 100-150 meter sections, each section including up to thirty-five or more uniformly spaced receivers 103. In general, each receiver 103 may comprise any suitable type of marine receiver configured to pick up seismic energy signals including, without limitation, a hydrophone or a geophone. Electrical or fiber-optic cabling interconnects the plurality of receivers 103 on each streamer 102 and connects each streamer 102 to vessel 101. Seismic data acquired by receivers 103 may be digitized at or near receivers 103 and then transmitted to vessel 101 through the cabling at relatively high data transfer rates (e.g., rates in excess of 5 million bits of data per second). As shown in FIG. 2, receivers 103 are towed behind survey vessel 101. However, in other embodiments, the streamers (e.g., streamers 102) and the receivers (e.g., receivers 103) may be disposed along the sea floor as ocean-bottom cables. In yet other embodiments, the receivers disposed on the sea floor may be autonomous ocean-bottom nodes. Vessel-towed streamers and ocean-bottom nodes may also be used simultaneously.

Referring still to FIG. 2, seismic acquisition system 100 also includes a marine seismic source 200. In this embodiment, source 200 is towed behind seismic survey vessel 101. However, in other embodiments, particularly those employing a low-frequency source, the source (e.g., source 200) is preferably towed behind a different vessel than the receivers (e.g. receivers 103). Although there are many different types of marine seismic sources, in this embodiment, seismic source 200 is an oscillating piston seismic source that propagates acoustic energy signals into the water 111 and subsurface geological formations over an extended period of time as opposed to the near instantaneous energy provided by impulsive sources. Source 200 and receivers 103 are deployed below the ocean's surface 110, with the optimal depth dependent on a variety of factors including, without limitation, the state of the seas (e.g., waves, currents, etc.), the towing strength of the equipment, and the desired frequency range to be produced and recorded. For a low-frequency marine seismic source producing acoustic energy in the range 2-8 Hz, for example, an optimal tow depth of the source would be approximately 60 m.

Equipment aboard vessel 101 controls the operation of source 200 and receivers 103, and records the data acquired by receivers 103. The recorded data is used to produce seismic surveys that estimate the distance between the sea surface 110 and subsurface structures below the sea floor 108 such as structure 106. To determine a distance to subsurface structure 106, source 200 emits seismic energy waves 107 that propagate through the water 111 and the sea floor 108 into the subsurface geological formations. Energy waves 107 reflect off subsurface structures such as structure 106 as "echoes" or reflected seismic energy waves 109. A portion of the reflected seismic energy waves 109 are detected by receivers 103, converted into electrical signals, and recorded as seismic data for subsequent processing. By determining the time for the seismic waves 107 to travel from source 200 to subsurface structure 106 and reflect off structure 106 as echoes 109 to receivers 103, an estimate of the distance (both horizontally and vertically), geometry, topography, position, impedance, fluid type, and lithology of subsea geologic structures, among other parameters, can be determined. For example, certain topographical features and amplitudes of recorded seismic data are indicative of hydrocarbon reservoirs.

Figure 3:
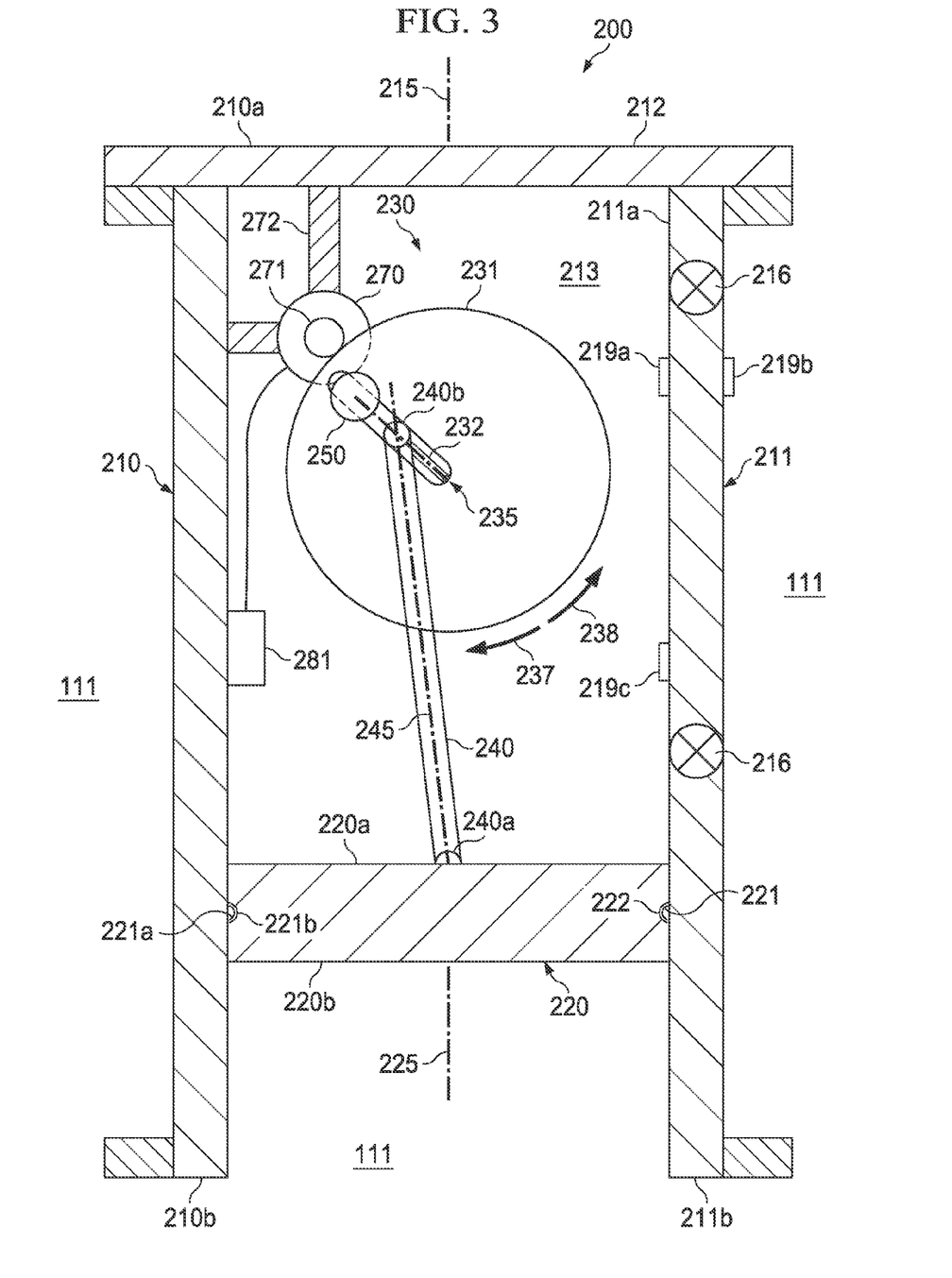
FIG. 3 is a schematic cross-sectional front view of an embodiment of the marine seismic source of FIG. 2.
Figure 4:
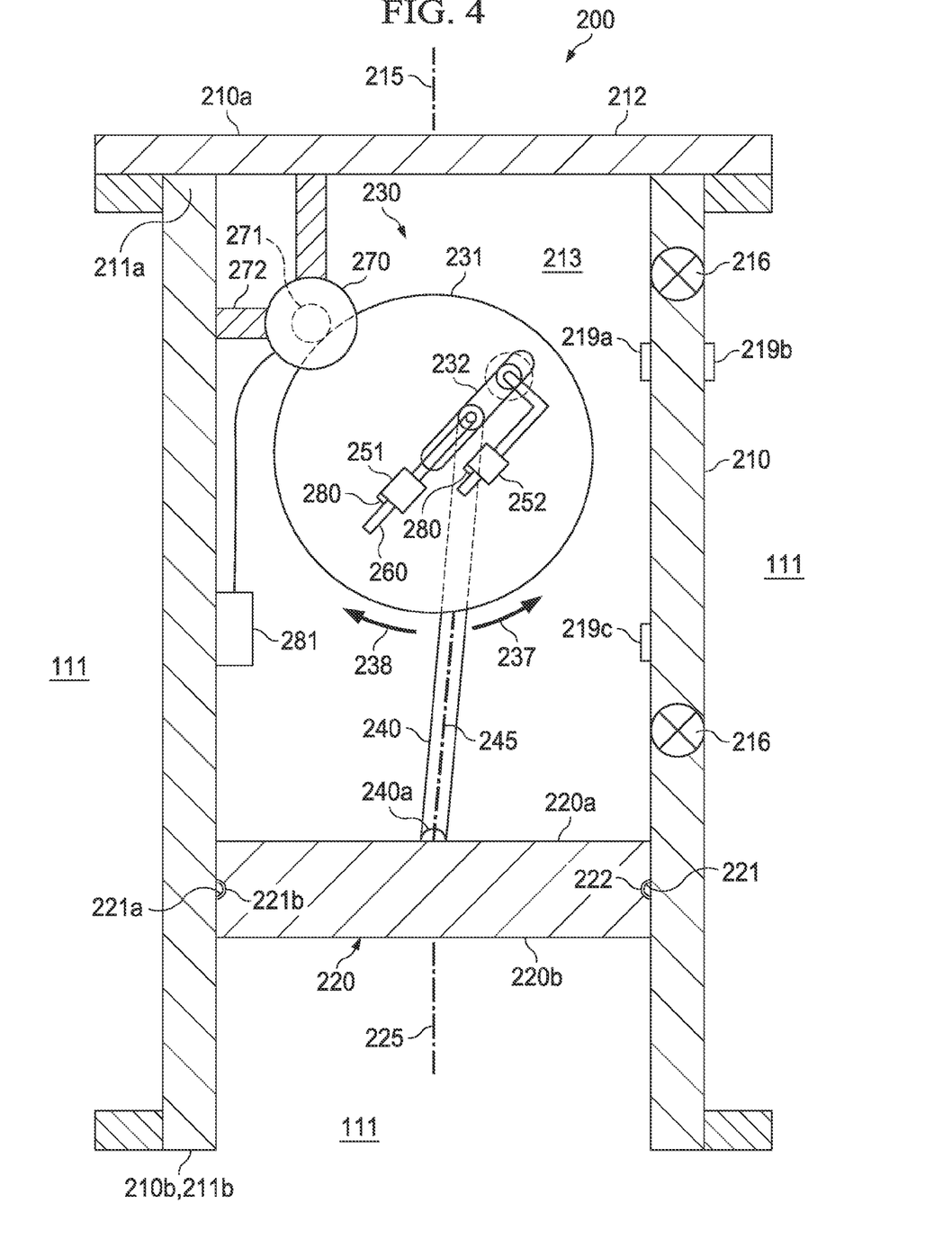
FIG. 4 is a schematic cross-sectional back view of the of the marine seismic source of FIG. 2.

Referring now to FIGS. 3 and 4, an embodiment of marine seismic source 200 disposed in water 111 is shown. During use, seismic source 200 is disposed below the surface 110 of water 111 as shown in FIG. 2 to generate acoustic energy waves for marine seismic surveys. In this embodiment, source 200 includes an outer housing 210, a piston 220 coaxially disposed in housing 210, and a piston drive assembly 230 disposed within housing 210. As will be explained in more detail below, piston drive assembly 230 reciprocates piston 220 within housing 210 to generate acoustic energy waves in water 111. Consequently, marine seismic source 200 may also be referred to as an oscillating or reciprocating piston marine seismic source.

Referring still to FIGS. 3 and 4, housing 210 has a central or longitudinal axis 215, a first or upper end 210a, and a second or lower end 210b opposite end 210a. In this embodiment, housing 210 includes a tubular body 211 and an end cap 212 attached to body 211. Body 211 is coaxially disposed about axis 215 and has a first or upper end 211a coincident with housing end 210a, and a second or lower end 211b coincident with housing end 210b. Lower end 211b of body 211 is open to water 111, however, upper end 211a is occluded and closed by end cap 212. Accordingly, upper end 210a of housing 210 may also be described as a closed end, and lower end 210b of housing 210 may also be described as an open end. Cap 212 sealingly engages body 211, thereby restricting and/or preventing fluid flow into and out of body 211 at upper end 210a.

Together, body 211, end cap 212, and piston 220 define an inner chamber 213 within housing 210. Thus, chamber 213 extends axially between piston 220 and end cap 212, and extends radially from axis 215 to body 211. Inner chamber 213 is preferably filled with a gas such as air or nitrogen, and is sealed such that the ingress and egress of water into chamber 213 is restricted and/or prevented.

Housing 210 may include one or more through ports that provide passages for electrical connections (e.g., sensor cables, electronic control wiring, etc.), power supply lines, compressed air supply lines, hydraulic fluid supply lines, and electrical connections, etc. For purposes of clarity, such ports, electrical connections, wiring, and various supply lines are not shown in FIGS. 3 and 4. Any ports preferably include fluid tight seals that allow the connections or lines to pass therethrough, while restricting and/or preventing the ingress or egress of water into chamber 213.

In this embodiment, housing 210 also includes a plurality of drain valves 216 disposed along body 211. Valves 216 allow any liquid (e.g., water 111) within chamber 213 to be drained. In addition, a plurality of sensors 219a, b, c are coupled to housing 210. In particular, an internal pressure sensor 219a detects and measures the pressure within housing 210, an external pressure sensor 219b detects and measures the pressure outside of housing 210 (i.e., the pressure of water 111), and a fluid level sensor 219c detects and measures the level of any liquid (e.g., water 111) that may have entered housing 210.

As previously described, piston 220 is coaxially disposed within cylinder 210. In particular, piston 220 slidingly engages the cylindrical inner surface of body 211 and is positioned proximally to open end 210b. Piston 220 has a central axis 225 coaxially aligned with housing axis 215, a first or upper end 220a, and a second or lower end 220b.

When source 200 is disposed subsea as shown in FIG. 2, water 111 is free to flow axially into open end 210b and engage piston 220. Thus, lower end 220b faces and acts against water 111 within open end 210b of housing 210, whereas upper end 220a faces inner chamber 213 and acts against the gas within chamber 213. In this embodiment, each end 220a, b is planar. However, in other embodiments, one or both of the axial ends of the piston (e.g., ends 220a, b of piston 220) may be non-planar. For example, the end of the piston facing the water (e.g., lower end 220b) may comprise a cone or bullet-shaped geometry and surface as disclosed in U.S. Patent Application No. 61/290,611 and PCT Patent Application No. PCT/US2010/62329, each of which is hereby incorporated herein by reference in its entirety for all purposes.

Referring still to FIGS. 3 and 4, an annular seal member 221 is radially positioned between piston 220 and housing 210. In this embodiment, seal member 221 is seated in an annular recess or seal gland 222 in the radially outer surface of piston 220. Seal member 221 is radially compressed between piston 220 and housing 210 and sealingly engages piston 220 and housing 210. More specifically, seal member 221 forms an annular, radially outer dynamic seal member 221a with housing 210 and an annular, radially inner static seal member 221b with piston 220. Seals 221a, b restrict and/or prevent fluid flow between piston 220 and housing 210 as piston 220 axially reciprocates relative to housing 210. Accordingly, seal member 221 restricts and/or prevents water 111 external to the seismic source 200 from moving axially between piston 220 and housing 210 into inner chamber 213, and restricts and/or prevents gas in inner chamber 213 from moving axially between piston 220 and housing 210 into water 111 in open end 210b.

Depending on the application and desired characteristics of the acoustic waves to be produced by source 200 (e.g., frequency range, amplitude, etc.), the maximum outer radius of piston 220 and cylinder 210 (measured perpendicularly from axes 215, 225) may be varied. For most applications, piston 210 will have a maximum outer radius of the order of approximately half a meter to a few meters, depending on the desired frequency range and amplitude of acoustic radiation to be produced.

Referring now to FIGS. 3-6, piston drive assembly 230 is disposed within inner chamber 213 and axially reciprocates piston 220 within housing 210. As piston 220 reciprocates, lower end 220b acts against the water 111 in open end 210b, thereby generating acoustic energy waves that propagate downward through the water 111. As will be explained in more detail below, the frequency and amplitude of the acoustic waves generated by reciprocating piston 220 may be controlled and varied by drive assembly 230.

In this embodiment, piston drive assembly 230 includes a flywheel 231, a drive or connecting rod 240 extending from flywheel 231 to piston 220, a fixed or additional mass member 250, a first linear actuator 251, a second linear actuator 252, a first linkage 260 extending between first actuator 251 and connecting rod 240, and a second linkage 262 extending between second actuator 252 and mass member 250. As will be described in more detail below, the rotational movement of flywheel 231 drives the axial reciprocation of piston 220, and the frequency and amplitude of the axial oscillations of piston 220 are controlled by actuators 251, 252 via linkages 260, 262.

Referring still to FIGS. 3-6, flywheel 231 rotates about an axis of rotation 235 passing through the center of flywheel 231 and oriented perpendicular to axes 215, 225. In general, flywheel 231 may rotate about axis 235 in a first direction represented by arrow 237 or a second direction represented by arrow 238. In this embodiment, the density of flywheel 231 is uniform moving radially outward from axis 235. However, in other embodiments, the density of the flywheel (e.g., flywheel 235) may increase moving radially outward from the rotation axis (e.g., axis 235) to enhance the rotational inertia of the flywheel having a fixed total mass.

The rotation of flywheel 231 is powered by motor 270. In general, motor 270 may comprise any suitable motor for rotating flywheel 231, including, without limitation, an electric motor, a hydraulic motor, or a pneumatic motor. Further, motor 270 may drive the rotation of flywheel 231 by any suitable mechanism including, without limitation, a rotating output shaft, mating gears, direct magnetic induction of the flywheel, or combinations thereof. In this embodiment, motor 270 drives the rotation of a wheel or roller element 271 that engages the radially outer surface of flywheel 231. The rotation of roller element 271 is transferred to flywheel 231 via frictional engagement at the contact surfaces between roller element 271 and flywheel 231. Motor 270 is coupled to housing 210 such that motor 270 does not move translationally relative to housing 210, although the output shaft of motor 270 and roller element 271 are free to rotate relative to motor 270 and housing 210 in order to drive the rotation of flywheel 231 relative to housing 210. In this embodiment, support members 272 couple motor 270 to housing 210 and maintain the position of motor 270 relative to housing 210.

The rotational speed and direction of rotation of flywheel 231 (i.e., first direction 237 or second direction 238) is controlled by adjusting the output power, torque, speed, and direction of rotation of motor 270. Further, the rotation of flywheel 231 may be decreased and/or stopped with motor 270 and/or a separate braking device (not shown). For example, if motor 270 is an electric motor, simply cutting off power to the electric motor will decrease the rotational speed of flywheel 231 as friction between rotating components begin to convert rotational energy in the system into heat. Similarly, reconfiguring the connections to motor 270 to convert it into a generator will act as a braking device.

Figure 5:
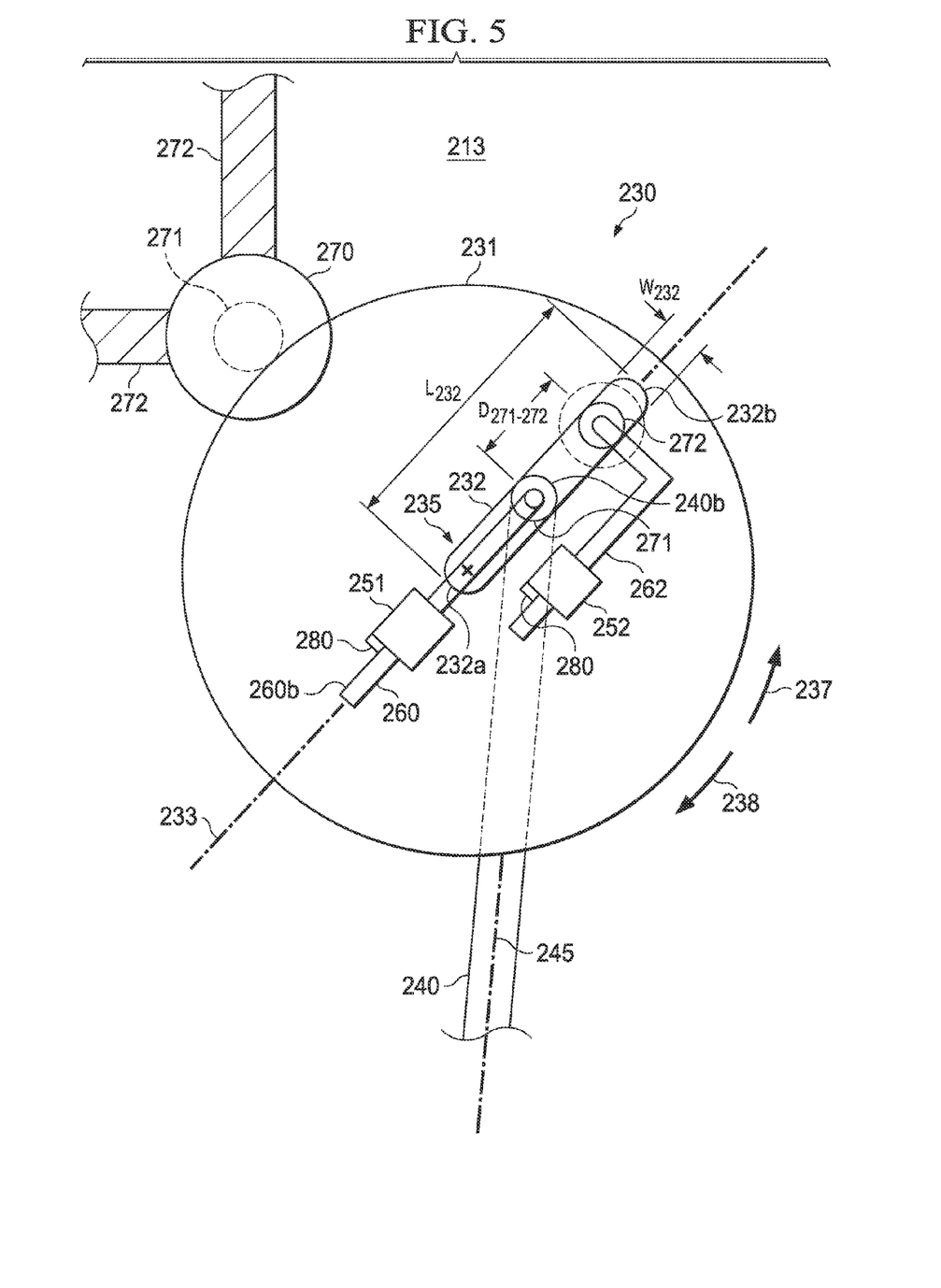
FIG. 5 is a partial schematic side view of the drive assembly of FIG. 4.
Figure 6:
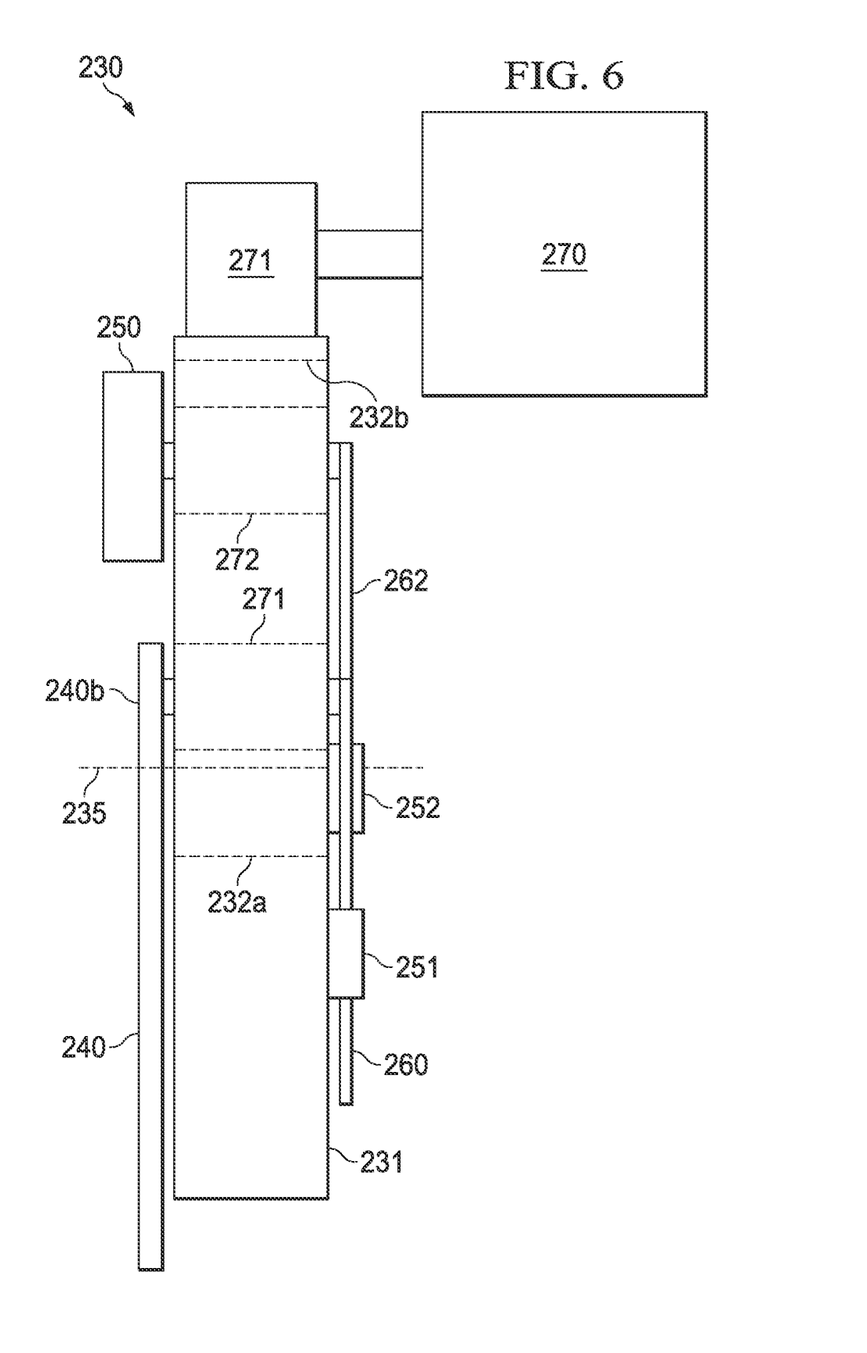
FIG. 6 is a schematic end view of the drive assembly of FIG. 4.

As best shown in FIG. 5, flywheel 231 includes an elongate through slot 232 having a central or longitudinal axis 233, a first end 232a at rotational axis 235 of flywheel 231, and a second end 232b distal axis 235 and proximal to the outer periphery of flywheel 231. In this embodiment, a projection of axis 233 is perpendicular to and intersects rotational axis 235 of flywheel 231. Accordingly, in this embodiment, elongate slot 232 is radially oriented relative to axis 235, and thus, ends 232a, b may also be referred to as radially inner and radially outer ends, respectively. Elongate slot 232 has a length $L_{232}$ measured axially (relative to axis 233) between ends 232a, b, and has a width $W_{232}$ measured perpendicular to axis 233. In this embodiment elongate slot 232 extends linearly between ends 232a, b. However, in other embodiments, the elongate slot (e.g., slot 232) may be non-linear, but preferably has a radially inner end (e.g., end 232a) at or near the flywheel axis (e.g., flywheel 231) and a radially outer end (e.g., end 232b) distal the flywheel axis.

First and second guide members 271, 272 are slidingly disposed within slot 232 and spaced apart an axial distance $D_{271-272}$ measured parallel to axis 233. Each guide member 271, 272 has a width measured perpendicular to axis 233 that is substantially the same or slightly less than width $W_{232}$ of elongate slot 232, and thus, guide members 271, 272 are free to move axially parallel to axis 233 within slot 232, but restricted from moving laterally relative to slot 232. In this embodiment, guide members 271, 272 are each cylindrical, and thus, the width of each guide member 271, 272 also represents its diameter. Although guide members 271, 272 are each positioned in the same slot 232 in this embodiment, in other embodiments, the two guide members (e.g., guide members 271 and 272) may be positioned in different slots in the flywheel (e.g., flywheel 231).

First guide member 271 is coupled to first actuator 251 via first linkage 260, and second guide member 272 is coupled to second actuator 252 via second linkage 262. As will be described in more detail below, the axial position and movement of first guide member 271 relative to axis 233 is controlled and adjusted by first actuator 251; and the axial position and movement of second guide member 272 relative to axis 233 is controlled and adjusted by second actuator 252. In this embodiment, first actuator 251 and second actuator 252 may be operated independently of each other such that the axial positions and movement of guide members 271, 272 relative to axis 233 may be varied relative to each other. For example, axial distance $D_{271-272}$ between members 271, 272 may be varied during operation of source 200. In other embodiments, the operation of the actuators (e.g., actuators 251, 252) may be linked to each other such that the axial distance between the guide members (e.g., axial distance $D_{271-272}$ between members 271, 272) is fixed, or varied pursuant to a predetermined algorithm.

Referring again to FIGS. 3-5, elongate connecting rod 240 has a central or longitudinal axis 245, a first or piston end 240a coupled to piston 220, and a second or flywheel end 240b coupled to guide member 271. First end 240a is pivotally coupled to piston 220 such that connecting rod 240 is free to pivot or rotate about first end 240a relative to piston 220, and second end 240b is pivotally coupled to guide member 271 such that connecting rod 240 is free to pivot or rotate about second end 240b relative to guide member 271, elongate slot 232, and flywheel 231.

Referring specifically to FIG. 5, first actuator 251 is secured to flywheel 231 and is coupled to first linkage 260, first guide member 271, and end 240b of connecting rod 240; and second actuator 252 is secured to flywheel 231 and is coupled to second linkage 262, second guide member 272, and mass member 250. In this embodiment, each linkage 260, 262 is an elongate rod extending from actuator 251, 252, respectively, to guide member 271, 272, respectively. A projection of axis 233 passes through end 240b and the center of mass member 250.

First actuator 251 controls the axial position and movement of first linkage 260, first guide member 271, and end 240b along slot 232 and axis 233, and hence, also controls the radial position and movement of first linkage 260, first guide member 271, and end 240b relative to flywheel axis 235. Further, second actuator 252 controls the axial position and movement of second linkage 262, second guide member 272, and mass member 250 along slot 232 and axis 233, and hence, also controls the radial position and movement of second linkage 262, second guide member 272, and mass member 250 relative to axis 235. Since actuators 251, 252 move linkages 260, 262, respectively, linearly parallel to axis 233, it may also be referred to as a "linear actuator." Although two actuators (e.g., actuators 251, 252) are included in this embodiment to control the position and movement of the end of the connecting rod (e.g., end 240b) and the mass member (e.g., mass member 250) relative to the flywheel axis, in other embodiments, the position and movement of the end of the connecting rod and the mass member relative to the flywheel axis may be controlled by a single actuator. Further, although there is a single mass member 250 in this embodiment, in other embodiments there may be two or more mass members, each with their own actuator to position them, for example disposed and controlled so as to maintain the center of mass of the flywheel system at the axis 235 throughout the operation of the source.

The amplitude of oscillations of piston 220 depend on the radial position of second end 240b relative to flywheel axis 235. More specifically, the greater the radial distance measured from axis 235 to second end 240b (along slot 232), the greater the amplitude of oscillations of piston 220. Conversely, the smaller the radial distance measured from axis 235 to second end 240b (along slot 232), the smaller the amplitude of oscillations of piston 220.

The frequency of oscillations of piston 220 depend on the rotational speed of flywheel 231. More specifically, the greater the rotational speed of flywheel 231, the greater the frequency of oscillations of piston 220, and the lower the rotational speed of flywheel 231, the lower the frequency of oscillations of piston 220. The rotational speed of flywheel 231 depends on a variety of factors including, without limitation, the rotational energy input into flywheel 231, decreases in the rotational energy of flywheel 231 due to friction and acoustic radiation losses, and the moment of inertia of flywheel 231. In general, the greater the rotational energy input into flywheel 231, the greater the rotational speed of flywheel 231. For a given rotational energy input into flywheel 231, an increase in the moment of inertia of flywheel 231 will decrease the rotational speed of flywheel 231, and a decrease in the moment of inertia of flywheel 231 will increase the rotational speed of flywheel 231. The moment of inertia of flywheel 231 may be increased by moving mass 250 radially outward relative to axis 235, and deceased by moving mass 250 radially inward relative to axis 235.

Without being limited by this or any particular theory, the amplitude of oscillations of piston 220 and the frequency of oscillations of piston 220 determine the amplitude and frequency of the acoustic energy waves output by seismic source 200. More specifically, the amplitude and frequency of the acoustic waves generated by source 200 are proportional to the amplitude of the oscillations of piston 220 times the square of the frequency of the oscillations of piston 220. Thus, by varying the radial position of second end 240b relative to flywheel axis 235, the amplitude of oscillations of piston 220 and associated acoustic energy waves may be controlled; and by varying the rotational speed of flywheel 231 (e.g., by varying the rotational energy input into flywheel 231 and by varying the moment of inertia of flywheel 231 with mass 250), the frequency of oscillations of piston 220 and associated acoustic energy waves may be controlled.

In general, actuators 251, 252 may comprise any suitable device for of controlling the radial position of second end 240b and mass member 250, respectively, relative to axis 235 including, without limitation, a pneumatic actuator, a hydraulic actuator, an electric actuator, a motor, etc. In this embodiment, each actuator 251, 252 is an electric actuator. Further, although actuators 251, 252 are described as a linear actuator, the actuator that controls the radial position of the end of the driveshaft (e.g., second end 240b) and the added mass member (e.g., mass member 250) may be operated by means other than simply moving the linkage (e.g., linkage 260, 262) linearly. For example, in other embodiments, the actuator(s) may rotate a threaded shaft that threadingly engages the guide members (e.g., guide members 271, 272), which are restricted from rotating with the threaded shaft. As a result, the rotation of the threaded shaft controls the radial position and movement of the guide member(s) relative to the rotation axis (e.g., rotation axis 235)—the direction of rotation controls whether the guide members move radially inward or outward, and the speed of the rotation controls the speed at which the guide members move radially. Actuators 251, 252 may be battery powered or supplied power by wires that allow actuators 251, 252 to rotate along with flywheel 231 without interference (e.g., by electric brushes that conduct current between stationary wires and rotating actuators 251, 252).

Referring now to FIGS. 4 and 5, in this embodiment, each actuator 251, 252 includes a sensor 280 that detects and measures the radial position of second end 240b and mass member 250, respectively, relative to rotation axis 235. Sensors 280 transmit the position data to a control system 281 coupled to housing 210 within chamber 213 (FIGS. 3 and 4). Control system 281 monitors the radial positions of second end 240b and mass member 250 relative to axis 235, and adjusts the radial positions of second end 240b and mass member 250 relative to axis 235 by controlling actuators 251, 252 during operation of source 200. By monitoring and controlling the radial positions of second end 240b, control system 281 controls the frequency and amplitude of the acoustic energy waves produced by source 200. In addition, control system 281 controls the output power, torque, rotational speed, and rotational direction of the motor that drives the rotation of flywheel 231. In this embodiment, control system 281 communicates wirelessly with sensors 280 and actuators 251, 252, and communicates with motor 270 by wire. However, in general, the control system (e.g., control system 281) may communicate with the sensors (e.g., sensors 280), the actuators (e.g., actuators 251, 252) and the motor (e.g., motor 270) by any suitable means, provided any wiring is configured to allow rotation of the flywheel (e.g., flywheel 231) and the sensors (e.g., sensors 280) coupled thereto without interference. Sensors 219a, b, c may also communicate measured pressure and fluid level data to control system 281. The data acquired by control system 281 is communicated to surface vessel 101 for monitoring and analysis, and control signals for the operation of drive assembly 230 are communicated from surface vessel 101 to control system 281.

Referring again to FIGS. 3-5, seismic source 200 is preferably operated in a cyclical fashion. Each cycle includes three phases—(a) an acceleration phase; (b) a sweep phase; and (c) a reset phase. In the acceleration phase, second end 240b of connecting rod 240 is positioned at center of flywheel 231 (i.e., at rotation axis 235) or just off-center, and a rotational torque is applied to flywheel 231 (e.g., with roller element 271) to increase the rotational speed of flywheel 231 until a predetermined and desirable rotational speed of flywheel 231 is achieved. It should be appreciated that when second end 240b and guide member 271 are disposed at rotation axis 235 (i.e., second end 240b and guide member 271 are disposed at the center of flywheel 231), piston 220 does not oscillate at all.

In the sweep phase, the rotational torque applied to flywheel 231 may be removed, and the radial distance measured from axis 235 to second end 240b is varied, causing the amplitude of the oscillations of piston 220 and associated acoustic radiation to vary. For example, during a sweep, the radial distance measured from axis 235 to second end 240b may be increased, causing the amplitude of the oscillations of piston 220 and associated acoustic radiation to increase. Alternatively, during a sweep, the radial distance measured from axis 235 to second end 240b may be decreased, causing the amplitude of oscillations of piston 220 and associated acoustic radiation to decrease. Still further, the radial distance measured from axis 235 to second end 240b may increased and then decreased during a single sweep to increase and then decrease the amplitude of piston 220 and associated acoustic radiation, or decreased and then increased during a sweep to decrease and then increase the amplitude of piston 200 and associated acoustic radiation. In this manner, the amplitude of oscillations of piston 220 and associated acoustic radiation can be varied and controlled during the sweep phase.

In the sweep phase, the rotational speed of flywheel 231 is varied, causing the frequency of oscillation of piston 220 to vary. In particular, during a sweep, the rotational energy imparted to flywheel 231 in the acceleration phase is lost to friction and the output acoustic radiation. These energy losses tend to decrease the rotational speed of flywheel 231, which would also decrease the frequency of oscillations of piston 220. By moving mass 250 radially outward from axis 235 along slot 232 during a sweep, thereby effectively increasing the moment of inertia of flywheel 231, the rotational speed of flywheel 231 may be further decreased. Thus, by maintaining or increasing the radial distance from axis 235 to mass 250 during a sweep, the rotational speed of flywheel 231 is decreased, and the frequency of oscillations of piston 220 and associated acoustic radiation is decreased. However, by moving mass 250 radially inward from axis 235 along slot 232 during a sweep, thereby effectively decreasing the moment of inertia of flywheel 231, the rotational speed of flywheel 231 may be increased, and the frequency of oscillations of piston 220 and associated acoustic radiation may be increased. In some cases, the radial distance from axis 235 to mass 250 may be increased and then decreased to increase the moment of inertia of flywheel 231 and then decrease the moment of inertia of flywheel 231, or the radial distance from axis 235 to mass 250 may be decreased and then increased to decrease the moment of inertia of flywheel 231 and then increase the moment of inertia of flywheel 231. In this manner, the frequency of oscillations of piston 220 and associated acoustic radiation can be varied and controlled during the sweep phase.

In a preferred embodiment, during the sweep phase, end 240b of connecting rod 240 is moved radially outward relative to flywheel axis 235 with actuator 251 and linkage 260, and additional mass member 250 is moved radially outward relative to rotation axis 235 with actuator 252 and linkage 262. As a result, the amplitude of oscillations of piston 220 increase and the frequency of oscillations of piston 220 decrease, and thus, the amplitude of the acoustic waves generated by source 200 increase and the frequency of the acoustic waves generated by source 200 decrease. The radial distance between end 240b and rotation axis 235 is increased until end 240b is positioned at end 232b of slot 232 and the minimum operating frequency and maximum operating amplitude of piston 220 and source 200 are achieved. In this embodiment, source 200 offers the potential to generate acoustic energy waves with frequencies as low as 0.5 Hz.

During the sweep phase, as piston 220 begins to move translationally relative to flywheel axis 235, some of the kinetic energy in flywheel 231 is transferred to piston 220 and its associated mass (i.e., the mass of the entrained water 111 in end 210b that moves with piston 220), and to additional mass member 250. In other words, at least a portion of the rotational kinetic energy imparted to flywheel 231 during the acceleration period is transferred to piston 220 and mass member 250. Thus, during the sweep period, the initial rotational kinetic energy of flywheel 231 is shared among flywheel 231, piston 220 (and its associated mass), and additional mass member 250. Energy that is transferred to additional mass member 250 helps to smooth the axial motion of piston 220. More specifically, additional mass member 250 allows for relatively fine control of the proportion of energy that is transferred from flywheel 231 to piston 220 during the sweep phase. In particular, control of the radial motion and position of additional mass member 250 relative to axis 235 allows the amplitude and frequency of the motion of piston 220 during the sweep to be independently controlled to achieve a desired amplitude and/or frequency (or desired amplitude and/or frequency range). Without being limited by this or any particular theory, this helps to produce a smoother, more nearly sinusoidal motion of piston 220, and hence, a purer acoustic output spectrum with fewer undesired harmonics. Without the additional degree of freedom of control allowed by additional mass member 250, piston 220 would move in a less controlled manner, producing undesirable harmonics in the acoustic output spectrum.

In the reset phase, motor 270 and/or separate brake are employed to decrease and/or stop the rotational speed of flywheel 231. In addition, flywheel end 240b of connecting rod 240 is moved radially inward to flywheel axis 235 with actuator 251 and linkage 260, and mass member 250 is moved radially inward toward flywheel axis 235 with actuator 252 and linkage 262, thereby resetting source 200 and preparing source 200 for the next cycle. Once source 200 is reset, the cycle may be repeated starting with the acceleration phase.

Embodiments described herein (e.g., source 200) offer the advantages of a conventional resonant system—once the system has been fully excited, further input power is only required to overcome damping losses and energy lost to acoustic radiation. However, unlike a conventional resonant system, the mechanical device herein described lessens the required peak input power even further by spreading its input over the entire quiet non-sweep phase (or optionally, even allowing power to be input continuously). More specifically, during the operation of most conventional oscillating piston seismic source, the actuation energy that drives the oscillation of the piston is input during the sweep phase. Typically, the duration of a sweep is relatively small compared to the total time between sweeps. Since the actuation energy must be input within a relatively small time window, the associated power requirements are relatively large. To the contrary, in embodiments described herein (e.g., source 200), the actuation energy that is eventually used to drive the oscillation of piston 220 is input prior to the sweep phase, thereby allowing the actuation energy to be input over a relatively long period of time (as compared to the duration of the sweep phase). Thus, flywheel 231 can be brought up to speed during the acceleration period using moderate power, rather than requiring high power for the relatively short duration of the sweep.

In general, the components of reciprocating piston seismic source 200 described herein (e.g., piston 220, housing 210, flywheel 231, mass 250, etc.) may be made from any suitable material(s) including, without limitation, metals and metal alloys (e.g., aluminum, stainless steel, etc.), non-metals (e.g., ceramics, polymers, etc.), composites (e.g., carbon fiber and epoxy composite, etc.), or combinations thereof. Since the piston (e.g., piston 220) and cylinder (e.g., housing 210) are exposed to subsea conditions, each preferably comprises a rigid, durable material capable of withstanding corrosion such as stainless steel.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A marine seismic source, comprising:
   a housing having a central axis, an open end, and a closed end opposite the open end;
   a piston coaxially disposed within the housing;
   a flywheel disposed within the housing and axially positioned between the closed end and the piston, wherein the flywheel is configured to rotate about a rotational axis;
   a connecting rod moveably coupling the piston to the flywheel, the flywheel controlling both a stroke of the piston and a frequency of an acoustic output of the marine seismic source;
   wherein the connecting rod has a first end pivotally coupled to the piston and a second end pivotally coupled to the flywheel;
   wherein the second end of the connecting rod has a first position at a first distance measured radially from the rotational axis, and a second position at a second distance measured radially from the rotational axis, wherein the first distance is less than the second distance; and
   wherein a rate of oscillation of the piston increases as the second end of the connecting rod is moved from the second position towards the first position because a combined momentum of the flywheel, connecting rod, piston, and water entrained by the piston is conserved.

2. The marine seismic source of claim 1, further comprising an added mass member moveably coupled to the flywheel, wherein the added mass member is configured to move radially relative to the rotational axis.

3. The marine seismic source of claim 1, further comprising an added mass member moveably coupled to the flywheel, wherein the added mass member has a first position at a third distance measured radially from the rotational axis and a second position at a fourth distance measured radially from the rotational axis, wherein the third radial distance is less than the fourth radial distance, and wherein the third radial distance is greater than the first radial distance and the fourth radial distance is greater than the second radial distance.

4. The marine seismic source of claim 2, further comprising a first actuator configured to move the second end of the connecting rod radially relative to the rotational axis.

5. The marine seismic source of claim 4, further comprising a second actuator configured to move the added mass member radially relative to the rotational axis.

6. The marine seismic source of claim 5, wherein the first actuator and the second actuator are attached to the flywheel.

7. The marine seismic source of claim 2, further comprising a motor disposed within the housing and axially positioned between the piston and the closed end, wherein the motor is coupled to the housing and configured to rotate the flywheel.

8. The marine seismic source of claim 5, wherein the flywheel includes an elongate through slot having a radially inner end at or proximal the rotation axis and a radially outer end distal the rotation axis; wherein the second end of the connecting rod is pivotally coupled to a first guide member that is slidingly disposed in the slot; and wherein the added mass member is coupled to a second guide member that is slidingly disposed in the slot.

9. The marine seismic source of claim 8, further comprising a first linkage extending from the first actuator to the first guide member and a second linkage extending from the second actuator to the second guide member.

10. The marine seismic source of claim 5, wherein the first actuator and the second actuator are linear actuators.

11. A method for generating a marine seismic energy wave in a body of water, comprising:
   (a) providing a seismic source, wherein the seismic source includes:
       a housing having a closed end and an open end;
       a piston slidingly disposed within the housing;
       a flywheel disposed in the housing between the closed end and the piston, wherein the flywheel is configured to rotate about a rotational axis;
       a connecting rod having a first end pivotally coupled to the piston and a second end pivotally coupled to the flywheel;
   (b) positioning the seismic source in the water;
   (c) rotating the flywheel about the rotational axis while controlling both a stroke of the piston and a frequency of an acoustic output of the marine seismic source;
   (d) reducing a first distance measured radially from the rotational axis to the second end of the connecting rod during (c) thereby increasing a rate of oscillation of the piston because a combined momentum of the flywheel, connecting rod, piston, and water entrained by the piston is conserved.

12. The method of claim 11, further comprising: (e) changing a second distance measured radially from the rotational axis to an added mass member moveably coupled to the flywheel during (c).

13. The method of claim 12, wherein (d) comprises increasing or decreasing the first distance during (c).

14. The method of claim 13, further comprising decreasing or increasing the first distance after (d).

15. The method of claim 12, further comprising: (f) generating acoustic energy waves with the seismic source during (d), wherein the acoustic energy waves have a frequency and an amplitude, wherein the frequency or amplitude of the acoustic energy waves change during (d); and (g) transmitting the acoustic energy wave through the water.

16. The method of claim 15, wherein (d) further comprises increasing the first distance during (c); wherein (e) further comprises increasing the second distance during (c); wherein (f) further comprises decreasing the frequency of the acoustic energy waves during (d) and increasing the amplitude of the acoustic energy waves during (d).

17. The method of claim 12, further comprising: increasing a rotational speed of the flywheel before (d); decreasing the rotational speed of the flywheel after (d); decreasing the first distance after (e); and decreasing the second distance after (e).

18. The method of claim 11, wherein the flywheel of the seismic source includes an elongate through slot extending radially outward from the rotational axis; wherein the second end of the connecting rod is coupled to a first guide member slidingly disposed in the through slot; wherein the added mass member is coupled to a second guide member slidingly disposed in the through slot; wherein (d) comprises moving the first guide member along the through slot; and wherein (e) comprises moving the second guide member along the through slot.

19. A method for generating a marine seismic energy wave in a body of water, comprising:
   (a) positioning a marine seismic source in the water, wherein the seismic source includes:
       a housing having a closed end and an open end;
       a piston slidingly disposed within the housing;
       a flywheel disposed in the housing between the closed end and the piston, wherein the flywheel is configured to rotate about a rotational axis;
       a connecting rod having a first end pivotally coupled to the piston and a second end pivotally coupled to the flywheel;
   (b) positioning the second end of the connecting rod at or proximal the rotational axis of the flywheel;
   (c) applying rotational torque to the flywheel after (b), the rotational torque controlling both a stroke of the piston and a frequency of an acoustic output of the marine seismic source;
   (d) increasing the rotational speed of the flywheel during (c);
   (e) radially moving the second end of the connecting rod relative to the rotational axis; and
   (f) controlling a rate of oscillation of the piston during (e) because a combined momentum of the flywheel, connecting rod, piston, and water entrained by the piston is conserved.

20. The method of claim 19, wherein (e) occurs after (c).

21. The method of claim 20, wherein (e) comprises moving the second end of the connecting rod radially outward relative to the rotational axis.

22. The method of claim 21, further comprising: (f) decreasing the rotational speed of the flywheel; and (g) moving the second end of the connecting rod radially inward relative to the rotational axis.

23. The method of claim 22, repeating (c), (d), and (e) after (f) and (g).

24. A marine seismic source, comprising:
   a housing having a central axis, an open end, and a closed end opposite the open end;
   a piston coaxially disposed within the housing, the piston comprising a first end and a second end, the second end facing and acting against water within the open end of the housing;
   a flywheel disposed within the housing and axially positioned between the closed end and the piston, wherein the flywheel is configured to rotate about a rotational axis;
   a connecting rod moveably coupling the piston to the flywheel;
   wherein the connecting rod has a first end pivotally coupled to the piston and a second end pivotally coupled to the flywheel; and
   wherein the second end of the connecting rod has a first position at a first distance measured radially from the rotational axis, and a second position at a second distance measured radially from the rotational axis, wherein the first distance is less than the second distance.

* * * * *